United States Patent [19]
Rotter

[11] Patent Number: 5,188,310
[45] Date of Patent: Feb. 23, 1993

[54] UNIDIRECTIONAL TAPE TENSION ELEMENT AND METHOD OF USE THEREOF

[75] Inventor: Gerhard Rotter, Mission Viejo, Calif.

[73] Assignee: Athana Incorporated, Torrance, Calif.

[21] Appl. No.: 663,737

[22] Filed: Mar. 1, 1991

[51] Int. Cl.⁵ .............................................. B65H 23/00
[52] U.S. Cl. .................................. 242/199; 242/192; 242/75.2; 242/76
[58] Field of Search ............... 242/192, 199, 200, 204, 242/75.2, 76; 360/132; 226/195

[56] References Cited

U.S. PATENT DOCUMENTS

| | | | |
|---|---|---|---|
| 3,991,956 | 11/1976 | Machida | 242/199 |
| 4,221,348 | 9/1980 | Moeller | 242/192 |
| 4,232,350 | 11/1980 | Ohta | 242/199 |
| 4,333,618 | 6/1982 | Seaman | 242/192 |
| 4,518,135 | 5/1985 | Gebeke | 242/199 |

FOREIGN PATENT DOCUMENTS

| | | | |
|---|---|---|---|
| 1046547 | 7/1953 | France | 242/199 |
| 55-150168 | 11/1980 | Japan | 360/132 |

Primary Examiner—Daniel P. Stodola
Assistant Examiner—John Q. Nguyen
Attorney, Agent, or Firm—Freilich, Hornbaker & Rosen

[57] ABSTRACT

A bidirectional tape cartridge incorporating first and second tensioning elements respectively located adjacent first and second reels on opposite sides of a transducer head and configured to act unidirectionally so that only the upstream element provides a significant drag force on the tape. Each tensioning element having a surface defining a tape path and including a first portion located closer to the corresponding reel and a second portion located closer to a corresponding tape guide, the first portion having a smaller radius of curvature than the second portion.

11 Claims, 3 Drawing Sheets

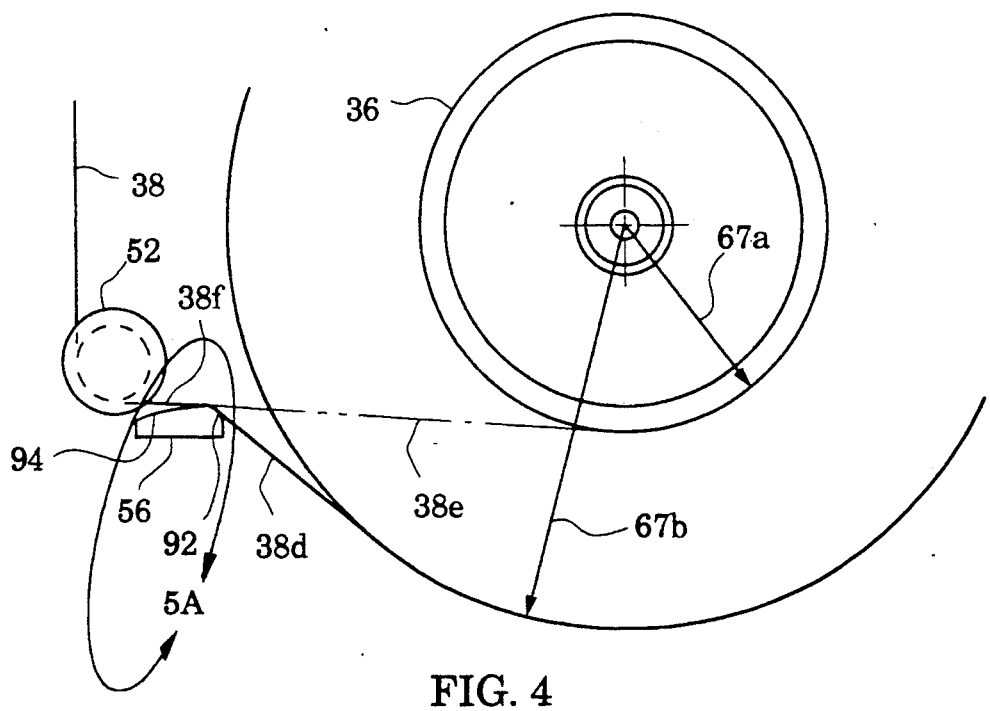
FIG. 4
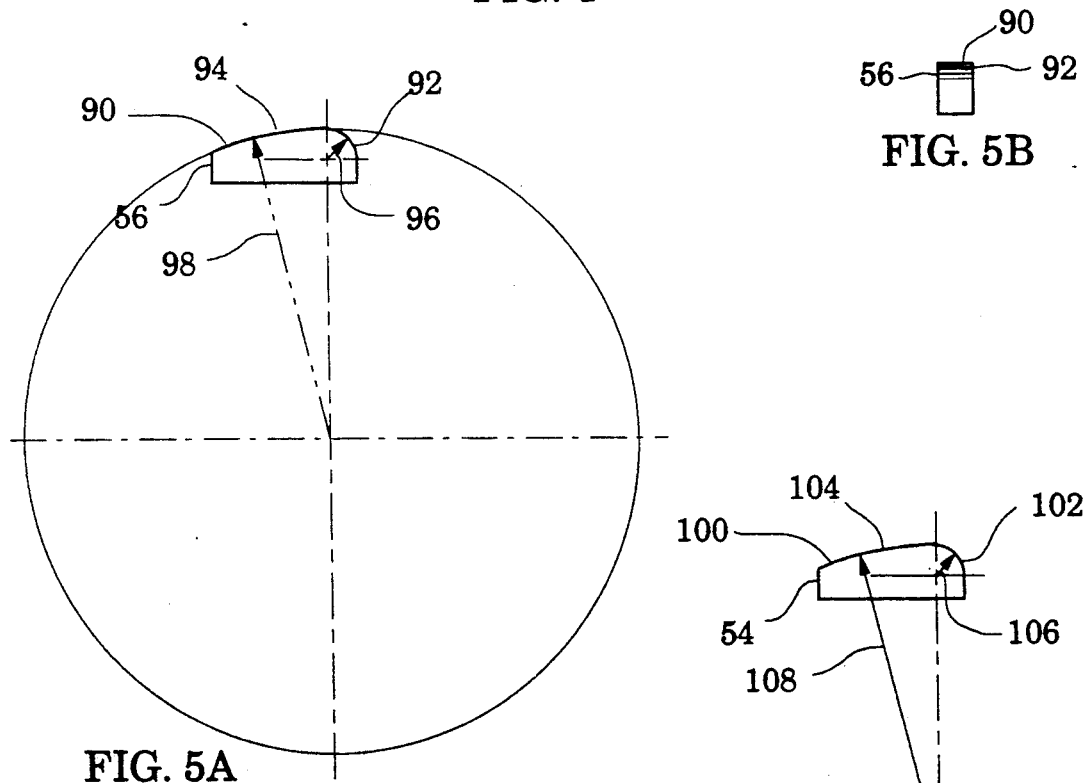
FIG. 5B
FIG. 5A
FIG. 5C

UNIDIRECTIONAL TAPE TENSION ELEMENT AND METHOD OF USE THEREOF

FIELD OF THE INVENTION

The present invention pertains to magnetic tape data cartridges and more particularly, to two reel tape cartridges having a bidirectional drive.

BACKGROUND OF THE INVENTION

In a bidirectional drive tape cartridge of the type shown in U.S. Pat. No. 3,692,255 in which the tape moves at high speeds between two reels and is subjected to high accelerations when the tape direction is reversed, it is important to minimize tape tension variations at the transducer head. Otherwise tape to head contact may be lost and data compromised.

One approach to reducing tension variations is shown in U.S. Pat. No. 4,221,348 which utilizes first and second tape wrap pins each mounted along the tape path between a reel and an associated tape guide. The tape wrap pins function to maintain the wrap angles around the guides more constant as the radius of the tape disposed on the reels varies between a minimum and a maximum. Despite the incorporation of the tape wrap pins, the tension still exhibits some variation between the beginning of tape (BOT) and the end of tape (EOT) and vice versa. Typically, tension increases from BOT to EOT by approximately 20%. Tests have revealed that although the pin upstream from the head has the most influence on the tension, in fact both pins contribute to the tension variations.

In a test using only a pin on the upstream side of the head, tension variations were reduced substantially as compared to the two pin case.

SUMMARY OF THE INVENTION

In recognition of the foregoing, the present invention is directed to a bidirectional tape cartridge incorporating first and second tension elements respectively located adjacent first and second reels on opposite sides of a transducer head and configured to act unidirectionally so that only the upstream element provides a significant drag force on the tape.

In a preferred embodiment, each unidirectional tension element includes a surface comprised of first and second portion spaced along the tape path respectively having first and second different radii of curvature. More particularly, the first surface portion is given a large radius to encourage the tape to fly over it with very little drag. The second portion is given a small radius to produce the desired drag force on the tape.

In accordance with the invention, the tension elements are oriented so that tape fed from the upstream reel (regardless of whether the first or second reel is upstream) approaches the small radius portion of the upstream tension element and the large radius portion of the downstream element whereby only the upstream element produces significant drag on the tape.

The novel features of the invention are set forth with particularity in the appended claims. The invention will be best understood from the following description when read in conjunction with the accompanying drawings.

BRIEF DESCRIPTION OF DRAWINGS

FIG. 4 is an enlarged view of the area enclosed by the line 4 of FIG. 1;

FIG. 5A is an enlarged view of a unidirectional tension element enclosed by the line 5A of FIG. 4;

FIG. 5B is a side elevation view of the unidirectional element of FIG. 5A; and

FIG. 5C is a view, similar to FIG. 5A, of another unidirectional tension element.

DETAILED DESCRIPTION

Figure 1:
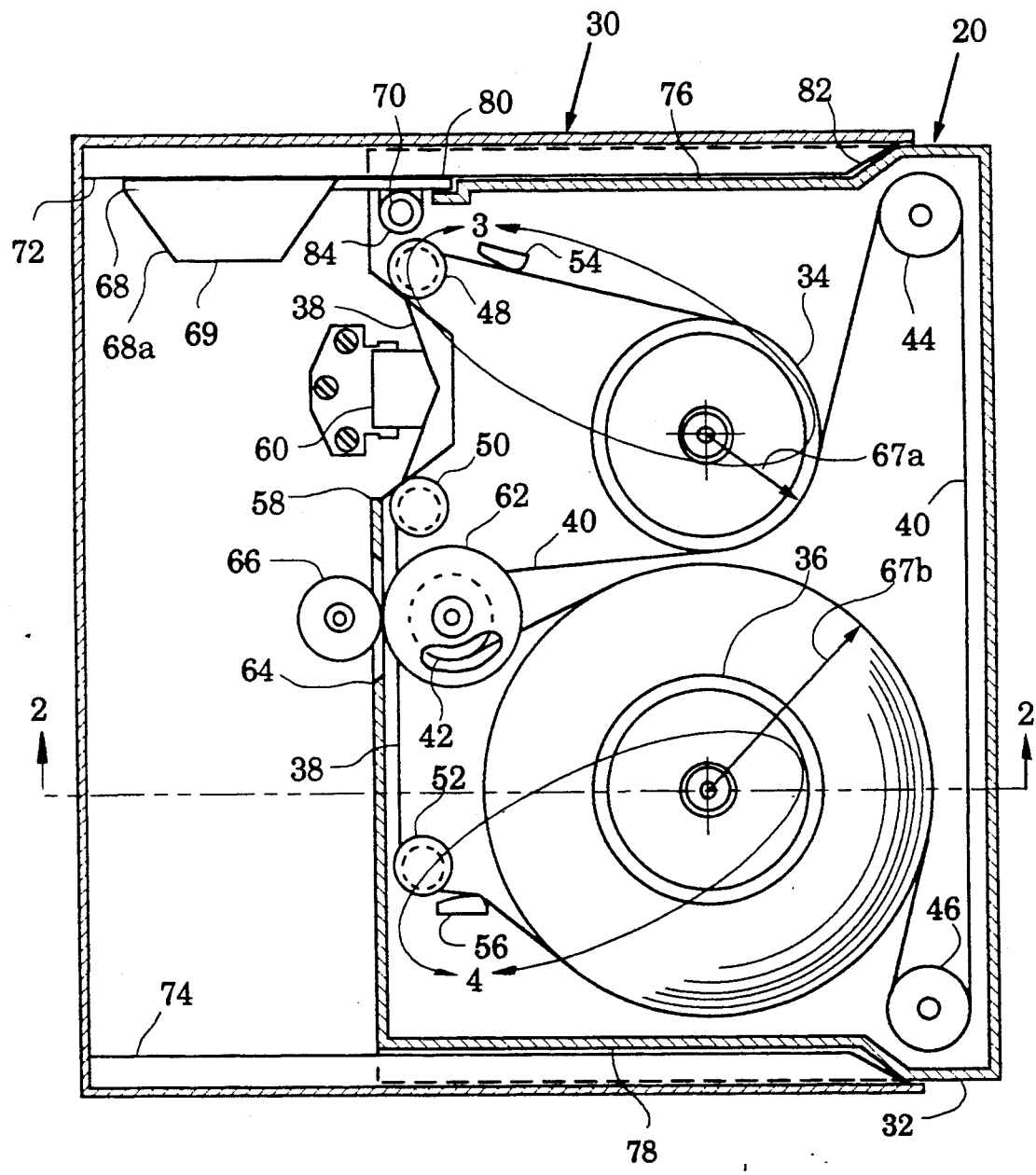
FIG. 1 is a sectional view of a tape cartridge in accordance with the present invention positioned in a support deck.

FIG. 1 is a sectional view of a tape cartridge 20 in accordance with the present invention positioned in a support deck 30. The tape cartridge 20 has a shell 32 in which a pair of reels 34, 36 are mounted with a magnetic tape 38 convolutely wound thereon. A resilient belt 40 closely contacts the tape 38 wound about each reel 34, 36. The belt 40 also is led around a belt drive roller 42 and a pair of belt guide rollers 44, 46. Thus the belt 40 moves linearly in response to rotation of the belt drive roller 42 to cause the reels 34, 36 to rotate by means of surface friction between the belt 40 and the magnetic tape 38.

Between the reels 34, 36 the magnetic tape 38 passes around three tape guides 48, 50, and 52. Between the reel 34 and the tape guide 48, the magnetic tape 38 is led over a tension element 54 in accordance with the present invention. The magnetic tape 38 passes over a similar tension element 56 between the reel 36 and the tape guide 52. The tape guides 48, 50 are positioned on either side of an opening 58 in the shell 32 where a transducer head 60, mounted on the support deck 30, contacts the magnetic tape 38.

As will be seen hereinafter, the function of each of the tension elements 54, 56 is to provide a greater drag on the tape 38 when it is in an upstream position relative to the head 60 than when downstream. That is, when tape 38 is being fed from reel 34 to reel 36, tension element 54 will provide a significant drag as compared to tension element 56. On the other hand, when tape 38 is being fed from reel 36 to reel 34, tension element 56 will provide a significant drag as compared to tension element 54.

The belt drive roller 42 has a rim portion 62 which contacts, through an aperture 64 in the shell 32, a drive roller which extends up from the support deck 30. Thus the drive roller 66, through the belt drive roller 42 and its rim 62, can drive the belt 40 in either direction causing the magnetic tape 38 to pass over the transducer head 60 as it is exchanged between the reels 34, 36. The radius of the magnetic tape 38 convolutely wound on the reels 34, 36 may vary between a minimum radius 67a shown on the reel 34 and a maximum radius 67b shown on the reel 36.

A door 68, having a flange 69 corresponding to the opening 58, is pivotally mounted on a pivot stud 70 and covers the opening 58 except when the tape cartridge 20 is inserted into the support deck 30. When inserted, cartridge guides 72, 74 in the support deck slide into recesses 76, 78 in the shell 32 and a tab 80 on the door 68 is pushed aside by the bevel 82 on the guide 72. The door 68 thus swings to the open position 68a shown in FIG. 1 making the magnetic tape 38 available for contact with the transducer head 60 through the opening 58. The door 68 is urged by a spring 84 which causes it to close over the opening 58 upon removal of the tape cartridge 20 from the support deck 30.

Figure 2:
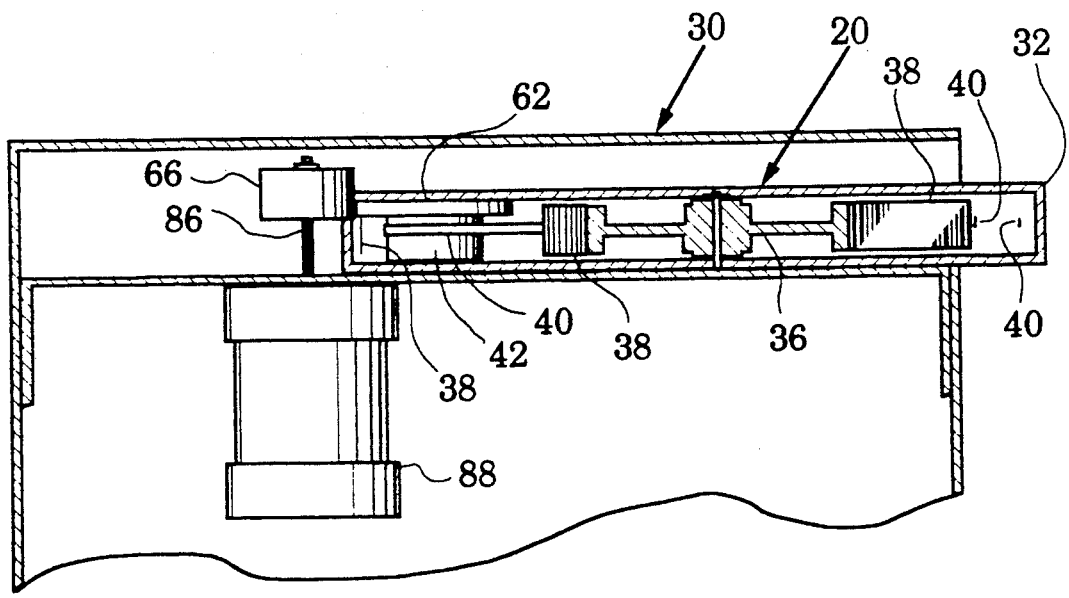
FIG. 2 is a sectional view along the plane 2—2 of FIG. 1.

FIG. 2 is a view along the line 2—2 of FIG. 1 and shows the tape cartridge 20 in the support deck 30. The drive roller 66 extends upward on a drive shaft 86 from a reversible motor 88 and contacts the rim 62 of the belt drive roller 42 through the aperture (64 in FIG. 1) in the shell 32. The belt 40 is seen to contact the belt drive roller 42 and the magnetic tape 38 convolutely wound on the reel 36. The magnetic tape 38 is also shown passing under the rim 62 of the belt drive roller 42.

The reels 34, 36 the belt drive roller 42 and the and the belt guide rollers 44, 46 shown in FIGS. 1 and 2 are rotatably mounted on axles which are fixed in the shell 32. The belt drive roller 42 and the belt guide rollers 44, 46 are preferably crowned to keep the belt 40 positioned thereon.

Figure 3:
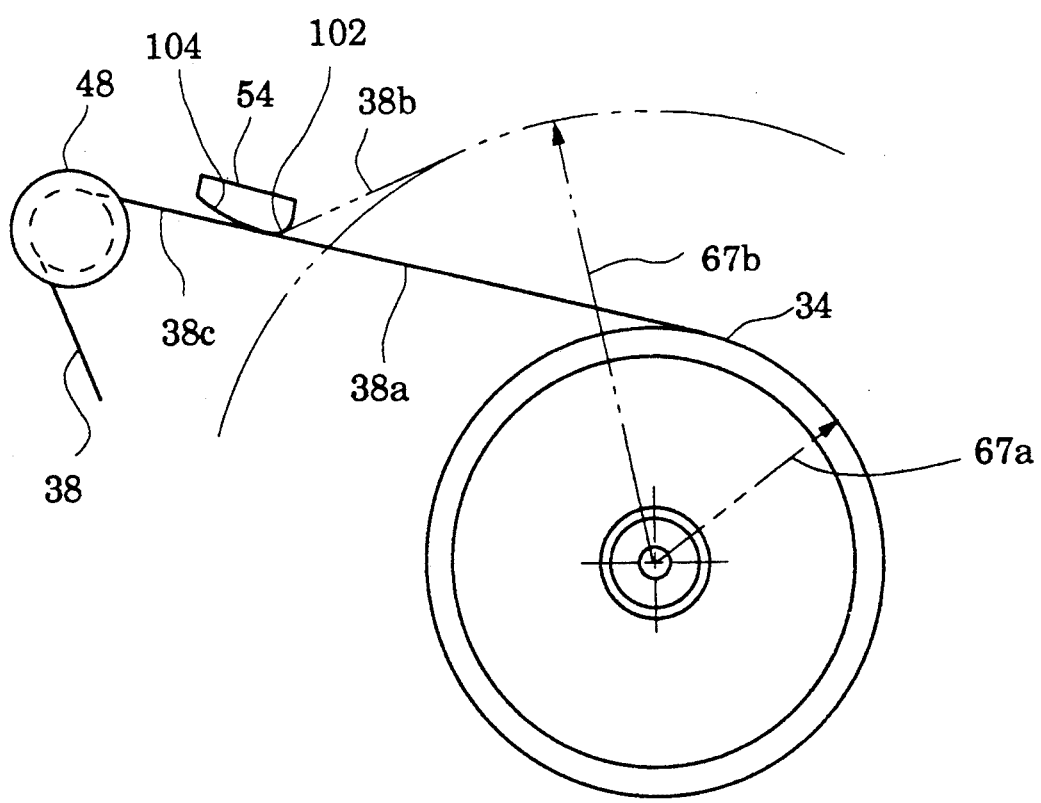
FIG. 3 is an enlarged view of the area enclosed by the line 3 of FIG. 1.

FIG. 3 is an enlarged view of the area enclosed by the line 3 of FIG. 1 and illustrates the reel 34 and associated tape guide 48 and unidirectional tension element 54. The tape 38 leads around the tape guide 48 and the unidirectional tension element 54 to where it is convolutely wound on the reel 34. The tape 38 follows the tape path 38a between the reel 34 and the unidirectional tension element 54 when the radius of the tape 38 disposed on the reel 34 has the minimum radius 67a. When the radius of the tape 38 disposed on the reel 34 has the maximum radius 67b the tape 38 follows the tape path 38b.

The unidirectional tension element 54 is positioned so that the tape paths 38a,38b are held tangent to the unidirectional tension element 54 and thus the tape path 38c between the unidirectional tension element 54 and the tape guide 48 remains substantially fixed as the tape radius varies between the radii 67a,67b. This, in turn, maintains the wrap angle about the tape guide 48 substantially constant and, hence, the frictional contact of the tape 38 with the tape guide 48 is substantially constant.

FIG. 4, which is a enlarged view of the area enclosed by the line 4 of FIG. 1, illustrates a similar arrangement of the reel 36 and associated tape guide 52 and unidirectional tension element 56. When the tape disposed on the reel 36 has assumed the maximum radius 67b the tape path 38d to the unidirectional tension element 56 is followed. When the tape 38 disposed on the reel 36 has the minimum radius 67a the tape path from the reel 36 to the unidirectional tension element 56 is 38e.

Thus, since the tape paths 38d, 38e are both held tangent to the unidirectional element 56, the tape path 38f between the unidirectional element 56 and the tape guide 52 remains substantially constant as the radius of the tape 38 on the reel 36 varies between the radii 67a,67b. Therefore, similar to the case with the tape guide 48, the wrap angle about the tape guide 52 remains substantially constant and, hence, the frictional contact of the tape 38 with the tape guide 52 substantially constant.

FIG. 5A is an enlarged view of the area enclosed by the line 5A of FIG. 4 illustrating the unidirectional tension element 56. The unidirectional tension element 56 has a surface 90 having a first portion 92 and a second portion 94. The first portion 92 is described by a first radius 96 while the second portion 94 is defined by a second radius 98 greater than the first radius 96. FIG. 5B is a side elevation view of the unidirectional tension element 56 of FIG. 5A. The width of the unidirectional tension element 56 is preferably sufficient to provide a surface for the entire width of the tape 38.

FIG. 5C is a view similar to FIG. 5A and shows the unidirectional tension element 54 shown in FIGS. 1 and 3. The unidirectional tension element 54 is similar to the unidirectional tension element 56. It has a surface 100 having a first portion 102 and a second portion 104. The first portion 102 is described by a first radius 106 while the second portion 104 is defined by a second radius 108 greater than the first radius 106. The unidirectional elements 54, 56 may be mounted in the shell 32 by any conventional method such as fasteners, pins, bonding, adhesives, molded reception areas and the like.

When a tape, at high speed, passes over a surface having a sufficiently large radius, the tape will start to fly over the surface thus contacting only the more extreme surface irregularities. The flying height is mostly dependent on the radius of the surface at the entry region where the tape begins to touch the surface. If the radius of the entry region is increased, flying height of the tape is increased and drag is decreased. Thus, an element having two surface portions described by two radii of different magnitude can present drag forces of different magnitude to a tape if the entry region of the tape is interchanged between the two portions.

It may be appreciated, therefore, that the unidirectional tension element 56 in FIG. 5A will present less drag to a tape having the second portion 94 as an entry region than when the tape has the first portion 92 as an entry region. Thus the unidirectional element 56 (and similarly the unidirectional element 54 of FIG. 5B) is seen to provide the favorable characteristics described above. If the second portion 94 (FIG. 5A) is the entry region for the magnetic tape 38 in FIG. 4 (the tape 38 approaching along the tape path 38f) the drag on the tape 38 will be reduced from that when the first portion 92 is the entry region for the tape 38 (the tape 38 approaching along any path between tape paths 38d,38e). Thus the tension imposed in the magnetic tape 38 is primarily set by the upstream unidirectional element 54, 56.

By positioning the unidirectional element 56 with the first portion 92 adjacent the reel 36, as illustrated in FIG. 4, the unidirectional tension element 56 will present a reduced tape drag when it is downstream from the transducer head 60 relative to when it is upstream from the transducer head 60. This is the favorable effect pointed to by the description above of tape flying heights. For the same reason the unidirectional tension element 54 is positioned with the first portion 102 adjacent the reel 34 and such that the first portion 102 is the entry region for any tape path between tape paths 38a,38b while the second portion 104 is the entry region for the tape along the tape path 38c.

An experiment was run with a tape cartridge 20 having the unidirectional elements 54, 56 mounted substantially in the positions illustrated in FIGS. 1, 3 and 4. The radii 96,106 were approximately 0.047 inches and the radii 98,108 were approximately 0.5 inches. The tension from BOT to EOT, measured at the transducer head 60 location, varied approximately 3% about a mean value for one tape direction and approximately 6% about a mean value for the other tape direction. The unidirectional elements 54, 56 were replaced by tape wrap pins similar to those disclosed in U.S. Pat. No. 4,221,341 and the experiment rerun. The tension from BOT to EOT varied approximately 11% about a mean value for both tape directions (the results reported in U.S. Pat. No. 4,221,348 gave approximately 11% and 19% variation about a mean value for the different tape directions). Thus it is seen that the use of unidirectional tension elements 54, 56 having reduced drag in the downstream location, relative to the upstream location, offers significant improvement in tape tension variability at the transducer head 60.

The ratio of the second radius 98 to that of the first radius 96 of the unidirectional tension element 56 shown in FIG. 5A was approximately 10.6 (similar ratio for the unidirectional tension element 54 of FIG. 5C) in the second experiment described above. A ratio greater than five is preferred while a ratio greater than ten is most preferred.

A unidirectional tension element 54, 56 having reduced downstream tape drag relative to its upstream tape drag has been provided, along with a method for use, to reduce tape tension variations at the transducer head 60 of a bidirectional tape cartridge 20.

It should be apparent that the unidirectional tension elements 54, 56 are but one embodiment of an element that would present reduced drag to a magnetic tape when in the downstream location from a transducer head relative to its tape drag in the upstream location. Thus, although the present invention has been described with reference to preferred embodiments, numerous modifications and rearrangements can be made with the equivalent result still embraced within the scope of the invention.

What is claimed is:

1. A tape cartridge, comprising:
   a shell having an opening;
   first and second reels rotatably mounted in said shell for bi-directional convolute winding of a magnetic tape therebetween;
   first and second guides mounted in said shell on opposite sides of said opening for guiding the magnetic tape across a transducer head inserted in said opening; and
   tensioning means, mounted between each reel and each guide, for increasing tension on said tape when said tape moves past it toward said opening, said tensioning means including:
   a first tensioning element fixedly mounted between said first reel and said first guide, said first tensioning element having a surface defining a tape path and including a first portion located closer to said first reel and a second portion located closer to said first guide, said first portion having a smaller radius of curvature than said second portion, said first tensioning element being positioned so that said tape describes a minimum wrap angle around said first tensioning element when there is a minimum amount of tape on said first reel and a maximum wrap angle around said first tensioning element when there is a maximum amount of tape on said first reel; and
   a second tensioning element fixedly mounted between said second reel and said second guide, said second tensioning element having a surface defining a tape path and including a first portion located closer to said second reel and a second portion located closer to said second guide, said first portion having a smaller radius of curvature than said second portion, said second tensioning element being positioned so that said tape describes a minimum wrap angle around said tensioning element when there is a minimum amount of tape on said second reel and maximum wrap angle around said second tensioning element when there is a maximum amount of tape on said second reel.

2. A tape cartridge, comprising:
   a shell having an opening;
   a pair of reels rotatably mounted in said shell for bi-directional convolute winding of a magnetic tape therebetween;
   means, responsive to an external source, for rotating said reels;
   first and second guides mounted in said shell for guiding the magnetic tape across a transducer head inserted in said opening; and
   first and second tensioning elements respectively mounted between said first reel and said first guide and between said second reel and said second guide for applying a drag to the magnetic tape upstream of said opening, each of said tensioning elements having a fixed surface including a first portion defined by a first radius and a second portion defined by a second radius greater than said first radius, said surface being positioned to contact the magnetic tape with the first portion located closer to its adjacent reel;
   said first tensioning element being positioned so that said tape describes a minimum wrap angle around said first tensioning element when there is a minimum amount of tape on said first reel and a maximum wrap angle around said first tensioning element when there is a maximum amount of tape on said first reel; and
   said second tensioning element being positioned so that said tape describes a minimum wrap angle around said tensioning element when there is a minimum amount of tape on said second reel and maximum wrap angle around said second tensioning element when there is a maximum amount of tape on said second reel.

3. A tape cartridge as defined in claim 2 wherein the ratio of said second radius to said first radius is greater than five.

4. A tape cartridge as defined in claim 2 wherein the ratio of said second radius to said first radius is greater than ten.

5. A tape cartridge as defined in claim 2 wherein:
   said external source has a reversible drive roller; and
   said rotating means comprises a belt means contacting the convolutely wound magnetic tape on each said reel for transferring rotational force from said drive roller to each said reel.

6. A tape cartridge as defined in claim 7 wherein said belt means comprises:
   a resilient belt;
   a belt drive roller rotatably mounted in said shell for transferring, from said drive roller, rotational force to said belt; and
   a pair of belt guide rollers, each guide roller positioned in said shell such that said belt is brought into contact with the magnetic tape convolutely wound on each said reel.

7. A tape cartridge as defined in claim 2 further comprising a door pivotally mounted on said shell for covering said opening, said door pivotable to provide the transducer head access to the magnetic tape.

8. A tape cartridge as defined in claim 2 wherein:
said external source has a reversible drive roller; and
said rotating means comprises a belt means contacting the convolutely wound magnetic tape on each said reel for transferring rotational force from said drive roller to each said reel.

9. A tape cartridge as defined in claim 8 wherein said belt means comprises:
a resilient belt;
a belt drive roller rotatably mounted in said shell for transferring, from said drive roller, rotational force to said belt; and
a pair of belt guide rollers, each guide roller positioned in said shell such that said belt is brought into contact with the magnetic tape convolutely wound on each said reel.

10. A tape cartridge as defined in claim 9 further comprising a door pivotally mounted on said shell for covering said opening, said door pivotable to provide the transducer head access to the magnetic tape.

11. A method of reducing tape tension variation, comprising:
inserting a tape cartridge with an opening into a cartridge support deck;
rotating, by means of a drive roller of the support deck, a pair of reels in said tape cartridge to convolutely wind a magnetic tape therebetween;
guiding said magnetic tape with a tape guide adjacent each reel past a transducer head inserted in said opening;
applying, with a fixed surface, a drag to the magnetic tape wherein said drag varies with direction of magnetic tape movement, said drag applying step comprising placing a surface, having a first portion defined by a first radius and a second portion defined by a second radius greater than said first radius, in contact with said magnetic tape between each reel and its adjacent said tape guide;
locating each surface so that said magnetic tape leaving each said reels initially contacts said first portion and said magnetic tape leaving each said tape guides initially contacts said second portion thereby causing said surface to induce in said magnetic tape a greater drag when said surface is upstream of said transducer head than when downstream of said transducer head;
adjusting the location of each said surface so that said surface begins to contact said magnetic tape when the magnetic tape disposed on said reel is at a minimum; and
orienting each said surface so that said magnetic tape remains in contact with said surface as the magnetic tape disposed on said reel increases.

* * * * *